United States Patent

[11] 3,616,930

[72] Inventor William McClements Muir
 Rhu, Scotland
[21] Appl. No. 808,237
[22] Filed Mar. 18, 1969
[45] Patented Nov. 2, 1971
[73] Assignee National Research Development Corporation
 London, England
[32] Priority Mar. 20, 1968
[33] Great Britain
[31] 13492/68

[54] SEMIPERMEABLE MEMBRANES
 12 Claims, 1 Drawing Fig.
[52] U.S. Cl. .................................................. 210/321,
 210/500
[51] Int. Cl. .................................................. B01d 31/00,
 B01d 13/00
[50] Field of Search .................................... 210/22, 23,
 321, 500

[56] References Cited
UNITED STATES PATENTS

| | | | |
|---|---|---|---|
| 3,083,118 | 3/1963 | Bridgeford | 117/47 |
| 3,220,960 | 11/1965 | Wichterle | 260/2.5 |
| 3,342,328 | 9/1967 | Swenson | 206/63.5 |
| 3,386,912 | 6/1968 | Lazare | 210/22 |

FOREIGN PATENTS

| | | | |
|---|---|---|---|
| 110,619 | 2/1961 | Pakistan | 210/23 |

Primary Examiner—Frank A. Spear, Jr.
Attorney—Jacobs & Jacobs

ABSTRACT: Membranes for extracorporeal haemodialysis are prepared from copolymers of acrylonitrile (80–90 percent) and dimethylaminoethyl methacrylate (20–10 percent) prepared by portionwise addition of reactants to a reactor. These have superior transfer properties for urea, creatinine, uric acid, and other blood components as compared with cellulosic membranes, and are prepared as blood envelopes for use in Ross-Muir and other dialyzers.

PATENTED NOV 2 1971  3,616,930
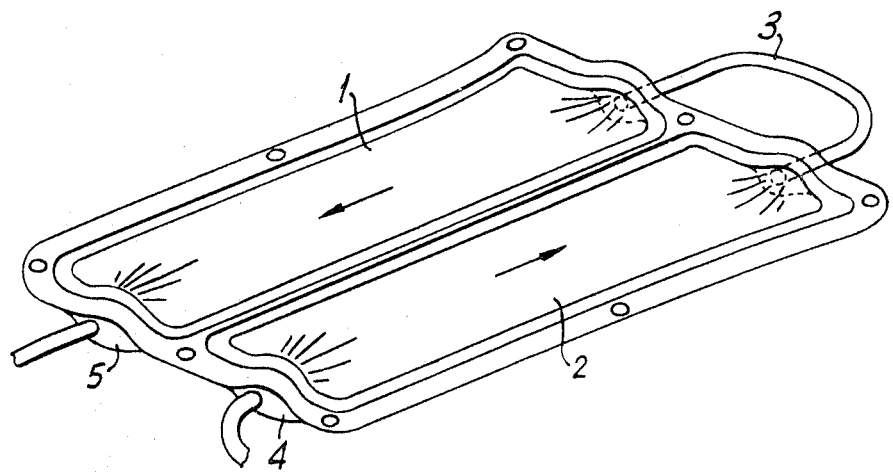
INVENTOR
WILLIAM McCLEMENTS MUIR
BY: Jacobs & Jacobs
ATTORNEYS

SEMIPERMEABLE MEMBRANES

This invention relates to semipermeable membranes and is particularly concerned with new membranes suitable for use in extracorporeal haemodialysis.

Extracorporeal haemodialysis is a technique now available for the treatment of patients suffering from acute or chronic renal failure and is being used successfully in many renal failure patients. Many designs of the so-called "artificial kidney" have been proposed and all designs fundamentally comprise a clinically acceptable dialysis machine having a blood zone and a dialysate fluid zone separated from each other by a semipermeable membrane. Blood from the patient's body is passed through the blood zone of the "artificial kidney" and impurities present in the blood are able to pass through the membrane driven only by concentration gradient into the dialysate fluid which usually runs to waste or is sometimes recirculated while the purified blood is passed back to the patient.

To be clinically acceptable for use in such "artificial kidneys," the membrane must conform to a very closely defined specification. The requirements for an acceptable membrane include adequate transport rate of each of the various blood toxins across the membrane, lack of permeability towards desired blood components which otherwise have to be replaced after haemodialysis, adequate mechanical strength and stability, etc., under operating conditions and, of course, lack of toxicity and thrombogenicity.

It is extremely difficult to find a membrane which fulfils all the above requirements and, although extracorporeal haemodialysis has been available for routine clinical use for many years, only one type of membrane material has even approached the properties required, this being the cellulosic membrane known under the registered Trade Marks "Cellophane" and "Cuprophane."

One of the main disadvantages of the cellulosic membranes is that the rate at which the major blood toxins pass through them is still too slow and colored high-molecular weight compounds such as urochrome and bilirubin in the 2,000–3,000 molecular weight range, which cause discoloration in the chronic renal failure patient by slow deposition in the tissues, are virtually not removed with "Cellophane" films. As a consequence "artificial kidneys" using them must be very large so as to present a large surface area of membrane, and present handling difficulties. As a further consequence, the time taken to cleanse the blood of a patient with renal failure tends to be prolonged, namely about 12–14 hours on two or three occasions a week for an average patient on a standard Kiil Kidney. If the dialysate rate could be increased, the advantages to the patient would be considerable and the size of existing equipment could be reduced.

A further major disadvantage of the available cellulosic membranes is that they are not heat sealable. According to present clinical practice, it is very important to prevent the patient's blood from coming into contact with any permanent nondisposable part of the "artificial kidney" and we have developed a form of "blood envelope" from a double layer of the membranes so that blood comes into contact with membrane surfaces only and inlet and outlet lines which are usually unplasticized polyvinyl chloride tubes. Because cellulosic membranes are not heat sealable, mechanical seals would have to be formed between the membrane sheets to prevent blood loss and to affix the inlet and outlet ports in the blood envelope. If a heat-sealable membrane were available, it would be possible to manufacture a perfectly fluidtight blood envelope provided with inlet and outlet ports, which could be sterilized at the manufacturing stage, which could be inserted in the haemodialyzer far more easily than the present mechanically sealed sheets and which could be disposed of after use with much less risk of spread of viral hepatitis or of other potential health hazard to patients and operators who service machines.

It has now been found possible to prepare heat-sealable or solvent-sealable membranes from certain novel acrylic copolymers which can be cast to give semipermeable membranes having a combination of properties which render them particularly suitable for use in extracorporeal haemodialysis.

The present invention provides a membrane-forming copolymer obtained by polymerization of acrylonitrile with dimethylaminoethyl methacrylate, the acrylonitrile providing 80–90 percent by weight of total monomer polymerized and the dimethylaminoethyl methacrylate providing 10–20 percent by weight of total monomer polymerized.

The haemodialysis membrane of the present invention is derived from the copolymer of acrylonitrile and dimethylaminoethyl methacrylate containing units equivalent to from 80 to 90 percent by weight of acrylonitrile and from 20 to 10 percent by weight of dimethylaminoethyl methacrylate, and has mass transfer rates with respect to the following compounds when measured in a Ross-Muir dialyzer and corrected to a membrane thickness of 0.001 inch:

urea: at least 1.5
creatinine: at least 0.5
glucose: not greater than 0.2 the figures being expressed as gram-moles $\times 10^{13}$/meter$^2$. min. mil.

The rate at which the resulting membrane is able to transfer blood toxins over to the dialysate fluid in extracorporeal haemodialysis techniques has been found to be very dependent, not only on the selection of the actual monomers from which the copolymer is derived, but also on their relative proportions and it is believed that membrane characteristics can be optimized by forming the copolymer from a monomer mixture containing about 85 percent by weight acrylonitrile and about 15 percent by weight dimethylaminoethyl methacrylate.

The monomer may be copolymerized in an aqueous system, conveniently by emulsion polymerization techniques in the presence of a peroxidic catalyst, and it is important that monomers be added to the polymerization reactor portionwise. For example, it is convenient to add on each occasion somewhere between 1 and 20 percent, preferably between 5 and 20 percent, of the total combined weight of monomers. The monomers may be stored in separate reservoirs and a portion added to the emulsion from each reservoir alternately, always starting with the addition of the hydrophilic monomer, dimethylaminoethyl methacrylate. Operating in this way, 10 percent for example, of the total weight of each monomer may be added on each occasion so that 10 additions are made from each reservoir alternatively with appropriate time intervals between each addition to allow polymerization to proceed. Another possibility is to make several additions of small quantities, e.g. 1 percent or less of the total weight, first of dimethylaminoethyl methacrylate and then of the acrylonitrile and to continue in this way until the total quantity of both monomers has been added. Alternatively, 5 additions each of 1 percent of the total weight of the first monomer can be made to introduce a total of 5 percent of the first monomer followed by 10 additions each of 1 percent of the second monomer to introduce a total of 10 percent of acrylonitrile monomer and this procedure may be followed until all the required monomer is added. This method approaches slow continuous addition of the monomers. A further possibility is to mix the monomers immediately prior to polymerization and then to make repeated additions to the emulsion in the reactor to which catalyst is added periodically.

It is preferred to phase the additions of monomer over a period of time so that each portion of monomer added to the emulsion has an opportunity to polymerize before the next portion of monomer is added. The time interval depends to some extent on the scale of polymerization, but is usually from 5 to 20 minutes. By way of example, when a total of 100 to 500 g. of monomer is polymerized, addition of from 10 to 20 portions can be made over a period of 60 to 120 minutes.

Emulsion polymerization is frequently carried out under reflux conditions but it is found that for the production of satisfactory haemodialysis membranes, it is better to conduct this polymerization below the reflux temperature and preferably below 65° C. measured in the gas space just above the surface of the reactants. The copolymerization itself is slightly exothermic and advantage may be taken of this to maintain the reaction temperature between 40° and 65° C., preferably between 45° and 60° C. measured as indicated, and although the mixture temperature may reach 80° C., on occasion it should not reflux. The course of the reaction can be followed by monitoring the temperature changes in the emulsion and also by observing viscosity changes in the emulsion. When 60 to 120 minutes elapses while 100 to 500 g. of monomer is added to an emulsion, the reactants may be retained in the polymerization vessel for perhaps a further 2 to 3 hours to ensure that the polymerization is substantially complete before the polymer is recovered from the emulsion.

As mentioned above, the monomers are conveniently copolymerized under emulsion polymerization techniques which, subject to the discussion above regarding temperature and monomer proportions and addition sequence, may be operated under conventional conditions. Thus, as emulsifying agent, one of the alkyl sulfonates, e.g. sodium dodecyl sulfate, may be used in an amount of 0.5–1 percent by weight or more e.g. up to 4 percent or even 8 percent based on the initial weight of water used. As catalyst, an aqueous solution of peroxidic compound, e.g. potassium persulfate, may be added before and/or during the polymerization.

Copolymer may be recovered from the emulsion by conventional methods and cast or otherwise formed into sheets to form a membrane of the desired thickness. A copolymer solvent may be used to break the emulsion and recover the copolymer in solution, solvents that may be used include dimethylformamide, dimethylacetamide, dimethylsulfoxide, methylene dichloride and chloroform or acetone. Alternatively, in certain instances the copolymer may be precipitated from the emulsion by addition of an inorganic salt such as calcium chloride, calcium sulfate or magnesium sulfate and the precipitated polymer filtered off, washed and even dialyzed against tap water using a "Cellophane" membrane prior to drying and dissolving the copolymer in the solvent.

The concentration of copolymer in the solvent can be adjusted to about 2.5 to 20 percent W.V. and this solution then cast on to plates to form a sheet of copolymer which can be used as a haemodialysis membrane. The wet thickness of cast solution is preferably 0.010 inch to 0.020 inch and this thickness can be adjusted using a doctor blade over the plate or by adjusting the concentration of the copolymer in the solvent to give membrane of dry thickness between 0.0006 inch and 0.002 inch.

The membrane is finally removed from the plate, washed thoroughly to remove any unreacted monomer which may be present and then dried. The membrane is then ready to be cut and shaped into the necessary form to fit the artificial kidney in question and can be heat sealed to form a blood envelope into which the blood inlet and outlet ports are sealed. A blood envelope of this type may be sterilized and stored in a sterilized package so that it can be withdrawn and immediately inserted into an "artificial kidney" machine without further sterilization being necessary. The risk of contaminating the permanent structure of the kidney machine with patients' blood is greatly reduced when such a blood envelope is used.

The membrane is conveniently sterilized by irradiation techniques but it has been found that if the membrane is treated with an alkylene oxide e.g. ethylene oxide to sterilize it, ethylene oxide reacts chemically with the copolymer in a manner which modifies the structure of the copolymer molecule and frequently improves the transport characteristics of the membrane with respect to urea. Sterilization of the membrane with ethylene oxide, e.g. by treatment with an airstream containing about 0.05–0.25 percent W.V. ethylene oxide at elevated temperature, e.g. 30°–60° C., for periods of 5 minutes to 3 hours represents a further valuable optional chemical treatment of the membranes. Treatment at higher temperatures is preferred e.g. 1 hour at 55° C. rather than 3 hours at 30° C.

The invention is illustrated by the following example:
a. Preparation of copolymer
The following recipe is used:

|  | Parts by Weight | Weight Taken (g.) |
|---|---|---|
| Acrylonitrile | 85 | 170 |
| Dimethylaminoethyl Methacrylate | 15 | 30 |
| Water | 200 | 400 |
| Sodium Dodecyl Sulfate | 1 | 2 |
| Potassium Persulfate | 0.2 | 0.4 |
| Pluronic Flake F68 | 0.125 | 0.025 |

Potassium persulfate is dissolved in 40 ml. distilled water and 4 ml. of the solution added to the reaction flask with sodium dodecyl sulfate, pluronic flake F68 and 360 ml. distilled water. The contents are stirred until clear. Nitrogen is passed through the apparatus continuously, starting 45 minutes before the first addition of monomer. Volumes of reagents added and temperatures recorded are shown in the reaction addition sequence below. The figures for the reagents are expressed cumulatively.

Prior to the first acrylonitrile addition, the contents are clear and have only a very slight blue shade. This addition causes a very slight cloudiness after 1 minute and between 2 and 3 minutes the contents turn white very sharply. The white shade is intense but fades slowly. The second dimethylaminoethyl methacrylate addition appears to increase the viscosity at 58 minutes, although the contents appear to be in white emulsion form, solid particles are probably present. The second acrylonitrile addition makes the solid particles obvious and the system heterogeneous although with stirring the heterogenicity is not marked. The shade is now off-white but the third dimethylaminoethyl methacrylate addition improves the whiteness slightly. Third and fourth acrylonitrile additions also make the heterogenicity obvious but stirring again reduces the effect. From 170 minutes onwards, the contents tend to set but can be broken up by stirring to give solid and clear liquid and the product at 360 minutes consists of these two components.

The product is transferred to a beaker and left in contact with 2 litres of cold water overnight (16 hours).

REACTION ADDITION SEQUENCE

| Time (mins.) | Temp., °C. | Dimethyl-aminoethyl methacrylate | Acrylonitrile | Potassium persulphate solution |
|---|---|---|---|---|
| 0 | 44 | 7 | 0 | 4 |
| 10 | 43 | 7 | 0 | 8 |
| 20 | 40 | 7 | 0 | 12 |
| 30 | 41 | 7 | 35 | 12 |
| 40 | 43 | 13 | 35 | 12 |
| 50 | 41 | 13 | 35 | 16 |
| 60 | 32 | 13 | 70 | 16 |
| 70 | 42 | 13 | 70 | 20 |
| 80 | 40 | 19 | 70 | 20 |
| 90 | 40 | 19 | 105 | 20 |
| 100 | 41 | 19 | 105 | 24 |
| 110 | 39 | 19 | 105 | 28 |
| 120 | 37 | 25 | 140 | 28 |
| 130 | 41 | 25 | 140 | 32 |
| 140 | 43 | 25 | 140 | 36 |
| 150 | 41 | 25 | 175 | 36 |
| 160 | 43 | 32 | 175 | 36 |
| 170 | 42 | 32 | 175 | 41 |
| 180 | 43 | 32 | 211 | 41 |

| Time (minutes) | Temperature (° C.) |
|---|---|
| 195 | 41 |
| 210 | 42 |
| 225 | 43 |
| 240 | 45 |
| 255 | 49 |
| 270 | 45 |
| 285 | 41 |
| 300 | 41 |
| 315 | 44 |
| 330 | 41 |
| 345 | 40 |
| 360 | 43 | b. Preparation of Membrane
After washing and reprecipitation from dimethylformamide, films are cast on glass plates from 10 percent solutions of the copolymer in dimethylformamide. The thickness of the film is controlled by doctor blading the solution across the plate and it is possible to recover from the plate large sheets of membrane, 10 sq. ft. or even larger if desired, which are pinhole-free and have a substantially uniform thickness between about 0.001 and 0.003 inch. Selected membrane samples are sterilized by treatment with a stream of air containing 1,400 mg./liter ethylene oxide for 3 hours at 30° C., or 1 hour at 60° C.

c. Membrane Characteristics i. The membrane is heat sealable at about 285° C. and can be sealed by conventional methods to form a closed envelope having silicone rubber or polyethylene inlet and outlet ports located in a fluidtight fixing in the sealed strip.

ii. Exposure tests of the membranes in a static test cell to heparinized fresh pig blood indicate that the membrane does not induce blood leakage, coagulation, platelet adhesion or haemolysis.

iii. The mechanical strength of the membrane has been tested in a dialysis cell in which the membrane is supported on a stainless steel wire mesh and subjected to an increasing pressure differential across the membrane. The mechanical strength of the membrane is of the same order as that of "Cuprophane" which ruptures in the region of 530–590 mm. mercury pressure.

iv. Transport characteristics of the membrane are determined with respect to urea, glucose, creatinine and uric acid in the dialysis cell (the Ross-Muir dialyzer) as described in U. S. Pat. No. 3,488,690 issued to Ross and Muir Jan. 6, 1970. The membrane is tested with respect to glucose as an ideal haemodialysis membrane should be substantially impermeable to glucose, significant loss of blood glucose, as occurs when "Cuphrophane" membranes are used, is clinically undesirable. A solution of the compound at a concentration to simulate its concentration in veinous blood is dialyzed against a conventional dialyzate liquid and the T value, the time taken for the initial concentration of the compound to fall by one-half, is determined. This may be compared with a corresponding T value for a "Cuprophane" membrane operating under identical conditions. T values are corrected by linear approximation for thickness variation so that they can be directly compared between membranes of different thickness. The figures are shown below.

T Values (minutes)

|  | Uncorrected | Corrected |
|---|---|---|
| Urea | 91 | 87 |
| Creatinine | 124 | 138 |
| Uric acid | 256 | 214 |
| Glucose | 552 | 403 |
| Phosphate (inorganic) | 565 | 412 |

The accompanying drawing shows two dialysis envelopes 1, 2, of membranes in accordance with the invention. The two envelopes are sealed together along one edge and interconnected at one end by external tubings 3. The direction of blood flow is indicated by the arrows, an inlet connection 4 to one envelope and an outlet 5 from the other are provided.

I claim:

1. A haemodialysis membrane derived from a copolymer of acrylonitrile and dimethylaminoethyl methacrylate containing units equivalent to from 80 to 90 percent by weight of acrylonitrile and from 20 to 10 percent by weight of dimethylaminoethyl methacrylate and having mass transfer rates with respect to the following compounds when measured in a Ross-Muir dialyzer and corrected to a membrane thickness of 0.001 inch:

urea: at least 1.5
creatinine: at least 0.5
glucose: not greater than 0.2 the figures being expressed as gram-moles $\times 10^{1}3$/meter$^2$. min. mil.

2. A membrane according to claim 1 in which the mass transfer rates are:

urea: 1.5–3.5
creatinine: 0.5–0.6
glucose: 0.2–0.05

3. A membrane according to claim 1 having a thickness of from 0.0006 to 0.003 inches.

4. A membrane according to claim 1 which has been obtained by stepwise addition to a polymerization zone of portions of monomer or portions of mixed monomers not exceeding 20 percent of the total combined weight of monomer.

5. A membrane according to claim 4 in which the copolymer is derived from 85 percent acrylonitrile and 15 percent dimethylaminoethyl methacrylate.

6. A membrane according to claim 4 having a thickness of from 0.001 to 0.003 inch.

7. A membrane according to claim 4 in which the copolymer is cross-linked with alkyleneoxy bridging groups.

8. A membrane according to claim 4 sterilized with ethylene oxide.

9. A heat-sealed closed envelope provided with an inlet port and an outlet port for the transmission of blood through the envelope, formed from a membrane according to claim 1 which is from 0.001 to 0.003 inch thick and which has been obtained by stepwise addition to a polymerization zone of portions of monomer or portions of mixed monomers not exceeding 20 percent of the total combined weight of monomer.

10. A heat-sealed closed envelope according to claim 9 comprising a copolymer of 85 percent acrylonitrile and 15 percent dimethylaminoethyl methacrylate.

11. A heat-sealed closed envelope according to claim 9 sterilized with ethylene oxide.

12. A membrane according to claim 1 sterilized with ethylene oxide.